Dec. 27, 1966 R. D. BALINT 3,293,697
APPARATUS FOR STRIPPING INJECTION MOLDED ARTICLES FROM A MOLD
Filed May 28, 1964 3 Sheets-Sheet 1

INVENTOR.
RUDOLPH DOUGLAS BALINT
BY
Barnes, Kisselle, Raisch & Choate
ATTORNEYS

Dec. 27, 1966     R. D. BALINT     3,293,697
APPARATUS FOR STRIPPING INJECTION MOLDED ARTICLES FROM A MOLD
Filed May 28, 1964     3 Sheets-Sheet 3
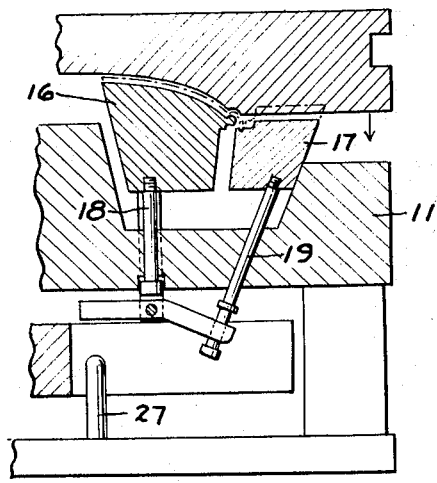
FIG. 5
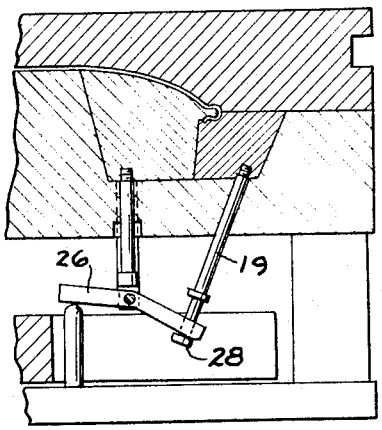
FIG. 4
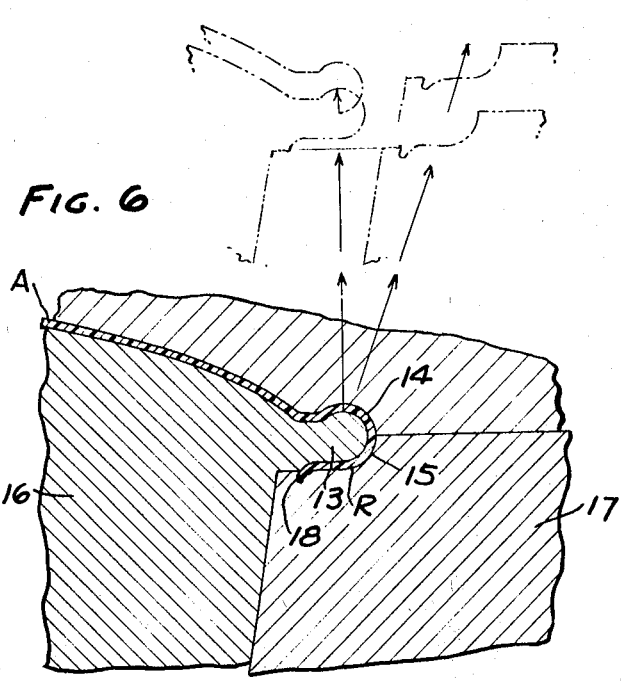
FIG. 6
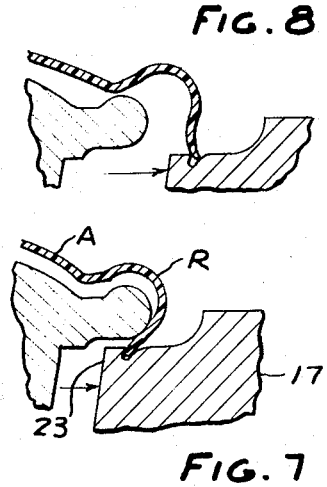
FIG. 8
FIG. 7
INVENTOR.
RUDOLPH DOUGLAS BALINT
BY
Burns, Kenselle, Raisch & Choate
ATTORNEYS 3,293,697
APPARATUS FOR STRIPPING INJECTION MOLDED ARTICLES FROM A MOLD
Rudolph D. Balint, Windsor, Ontario, Canada, assignor to International Tools Ltd., Windsor, Ontario, Canada, a corporation of Ontario, Canada
Filed May 28, 1964, Ser. No. 370,927
10 Claims. (Cl. 18—42)

This invention relates to injection molding and particularly to injection molding of plastic articles having re-entrant peripheral edges.

In the molding of plastic articles from a plastic material having elastic memory by injection wherein the articles have a re-entrant edge such that the edge curves back inwardly toward the main body of the plastic article, the mold conventionally has a peripheral nose around which the plastic is molded. When the mold halves are opened, the normal ejector pins move the plastic article away from the mold half having the nose portion but do not provide sufficient and properly directed force for completely stripping the article from the mold half. Accordingly, it is necessary for the operator to grasp the plastic article and strip it from the mold half. Obviously, such a procedure is time consuming and extremely difficult in view of the fact that the plastic article is quite hot.

It is therefore an object of this invention to provide an apparatus for automatically stripping the plastic article from the mold half.

It is a further object of the invention to provide such an apparatus which will operate effectively without interference with the injection molding cycle.

In the drawings:

FIG. 4 is a fragmentary sectional view taken along the line 4—4 in FIG. 1.

FIG. 5 is a view similar to FIG. 4 showing the parts in a different operative position.

FIG. 6 is a partly diagrammatic view on an enlarged scale showing the relative positions of the mold halves.

FIGS. 7 and 8 are views similar to FIG. 6 showing the parts in successive positions during ejection of the plastic article.

Figure 1:
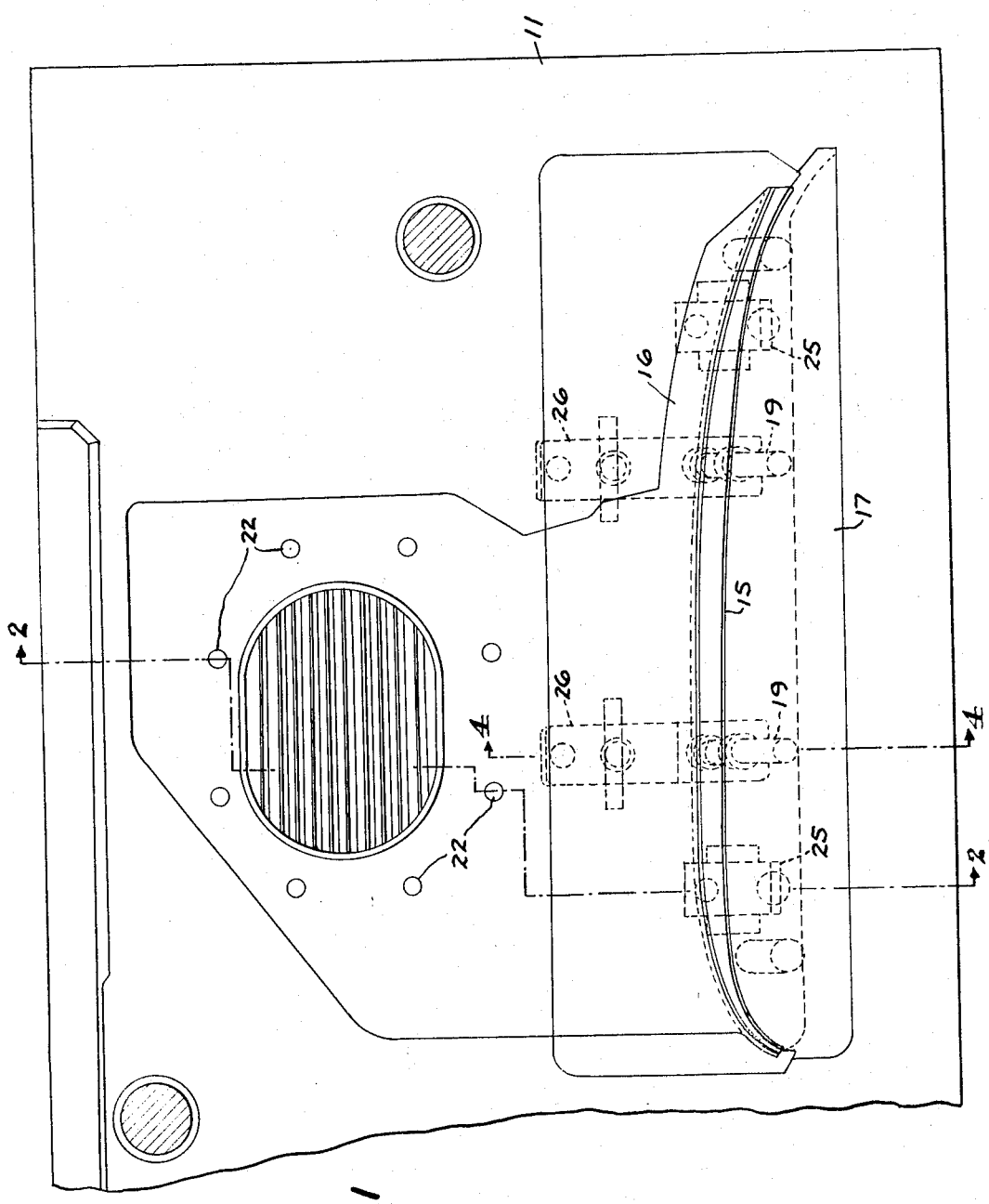
FIG. 1 is a fragmentary plan view of a mold half of an injection molding apparatus embodying the invention.
Figure 2:
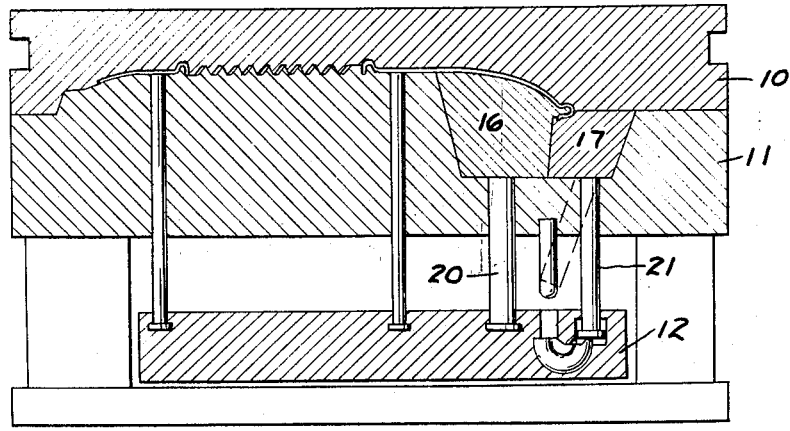
FIG. 2 is a sectional view of the mold halves taken along the line 2—2 in FIG. 1.

Referring to FIGS. 1 and 2, the molding apparatus embodying the invention is of generally conventional construction and comprises complementary mold halves 10, 11 which are adapted to be mounted on the platens of an injection molding machine which preferably operates to move the mold halves 10, 11 horizontally toward and away from one another. The molding apparatus includes an ejector plate 12 which is movable relative to the mold 11 when the mold halves 10, 11 are moved apart to eject the plastic article.

As shown in FIG. 6, the plastic article which is to be molded includes a peripheral re-entrant portion R that extends inwardly toward the main body of plastic article A. The re-entrant portion R is formed by a nose portion 13 on the mold half 11 and complementary molding surfaces 14, 15 on the mold half 10 and on the mold half 11, respectively.

In accordance with the invention, the nose portion 13 is formed as a portion of a first movable part 16 of the mold half 11. The surface 15 is formed as a portion of a second movable part 17 of the mold half 11 and includes a stripping groove 18 which engages the edge of the plastic article A and facilitates the ejection of the plastic article, as presently described.

As shown in FIGS. 4 and 5, guide pins 18a guide the first part 16 so that it is movable generally axially of the mold half 11. Guide pins 19 guide the second part 17 so that it is movable in a divergent path relative to the first part 16.

Figure 3:
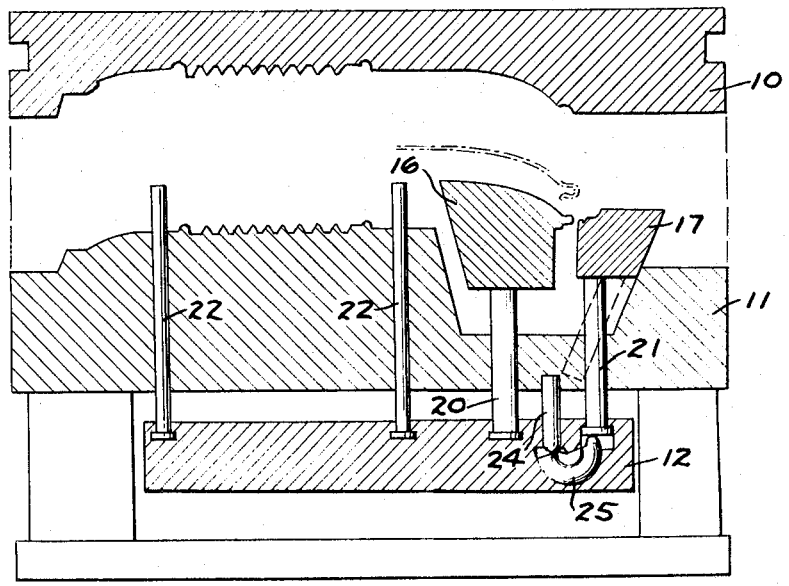
FIG. 3 is a view similar to FIG. 2 showing the mold halves in open position with the plastic article ejected.

Referring to FIGS. 2 and 3, ejector pins 20 extend between the ejector plate 12 and first part 16. Similarly, ejector pins 21 extend between the ejector plate 12 and the second part 17.

In accordance with the invention, after the plastic article has been molded and mold half 11 and ejector plate 12 are moved away from the mold half 10. The ejector plate 12 is then stopped so that the mold half 11 moves relative to the ejector plate 12 and ejector pins 22 on ejector plate 12 tend to strip the plastic article A from the mold half 11. At the same time, ejector pins 20, 21 move the mold parts 16, 17 away from the mold half 11 at substantially the same axial rate. However, since the guide pins 18, 19 are divergent to one another, the mold part 17 moves outwardly as shown in FIG. 7 carrying the free edge of the plastic article A with it. This uniform substantially equal axial rate of movement of the parts 16, 17 occurs until the edge 23 of the mold part 17 clears the nose portion 13 (FIG. 8). At this point, the ejector pins 21 are accelerated at a more rapid rate so that the second mold part 17 moves outwardly and axially at a greater rate than the mold part 16 to cause groove 18 to strip the edge of the plastic article from nose portion 13 of part 16 and eject the plastic article completely.

The acceleration is achieved by engagement of pins 24 on the mold half 11 with a curved actuator 25 pivoted in the ejector plate 12 and having one end thereof adapted to be engaged by the pins 24 and the other end thereof engaging the pin 21. After the ejector plate 12 stops and the mold half 11 continues to move, parts 16, 17 are moved at substantially the same axial rate until part 17 clears nose portion 13 of part 16. Continued movement of ejector plate 12 causes the pins 24 to engage the actuator 25 and provide a more rapid acceleration to the pins 21 thereby accelerating and moving the mold part 17 axially at a more rapid rate than the mold part 16.

After the plastic article has been ejected and the ejector plate 12 is moved in the opposite direction to reposition the parts 16, 17 for a subsequent molding cycle, it is necessary for the mold part 17 to move into position before the mold part 16 in order that the nose portion 13 will be in the proper relation to the molding surface 15. This is achieved by the utilization of pivoted levers 26 (FIGS. 4 and 5) on the ejector plate 12 which have one end thereof adapted to be engaged by pins 27 and the other ends engaging flanges 28 on the pins 19 to provide a more rapid return acceleration on the guide pins 19 and move the mold part 17 downwardly into position before the mold part 16 is in position.

In operation, after the plastic article has been injection molded by using plastic that has an elastic memory such as polyethylene or polypropylene, the relative movement of the mold half 11 and ejector plate 12 causes the mold parts 16, 17 to move in divergent paths at substantially the same axial rate until the part 17 has cleared the periphery of the nose portion 13 of the mold part 16. Thereafter, the mold part 17 is accelerated by engagement of the pins 24 with the actuators 25 to rapidly move the free edge and in turn the re-entrant portion R and strip it from around the nose portion 13 to eject the article after which the part drops off and can be removed by automatic conveyors or the like. The elastic memory of the article causes re-entrant portion R to return to its original molded shape.

It can thus be seen that I have provided a method and apparatus for ejecting a plastic article having a re-entrant portion without manual operations by the operator and without interfering with the normal molding cycle. In accordance with the invention, it is possible to move the parts 16, 17 in accordance with any desired paths which can be described by points moving in accordance with algebraic functions so that the required movements are produced to strip and eject molded articles having re-entrant portions of various configurations.

I claim:

1. In an injection mold apparatus, the combination comprising
   a mold half having a main body portion,
   a first movable part of said mold half including a peripheral nose portion,
   a second movable part of said mold half including a complementary surface to said nose portion which co-operates therewith and with another mold half to form a re-entrant portion on a plastic article,
   means for guiding said first part and said second part in generally diverging paths relative to said main body portion,
   means for moving said first and second mold parts in said divergent paths away from said main body portion at a rate in a direction axially of the main mold portion which is substantially equal until said second part clears the periphery of said nose portion of said first part,
   and means for thereafter accelerating said second part in said divergent path and at a velocity such that the second part moves axially a greater distance than said first part to thereby strip the plastic article from the nose of said first part.

2. The combination set forth in claim including means for returning said second mold part toward said mold half at a greater rate than said first mold part to thereby move the second mold part into proper registering position with said first mold part for a successive molding cycle.

3. In an injection molding apparatus comprising complementary mold halves,
   said mold halves having molding surfaces defining a peripheral nose portion,
   one of said mold halves having the peripheral re-entrant portion defining surfaces thereof formed by first and second movable parts,
   means for guiding said first mold part for movement generally axially,
   means for guiding said second mold part for movement in a divergent path relative to the movement of one part,
   said first part of said mold having a peripheral nose portion,
   said second part having a complementary surface defining the re-entrant portion of a plastic article and having a groove adapted to engage the free edge of the plastic article,
   an ejector plate,
   ejector pins mounted on said plate and movable through said one mold half to engage the plastic article and eject the major portion of the plastic article from the mold half,
   an actuating pin providing interconnection between said ejector plate and said first mold part,
   an actuating pin providing interconnection between said ejector plate and said second mold part,
   whereby upon initial movement of said ejector plate, said first and second mold parts are moved in a divergent path at substantially the same axial rate,
   and means operable after predetermined movement of said ejector plate to provide an increase acceleration to said second mold part after said second mold part has cleared the nose portion of said first mold part to move said second mold part in its divergent path at a more rapid rate and thereby cause the plastic article to be stripped from the nose portion of the first part.

4. The combination set forth in claim 3 including means for accelerating the second mold part at a more rapid rate upon movement of ejector plate in the opposite direction to move the second mold part toward its molding position and advance said first part so that the molding surface of said second mold part is in proper relation to the molding surface of said first mold part for the subsequent molding cycle.

5. In an injection mold apparatus, the combination comprising
   a mold half having a main body portion,
   a first movable part of said mold half including the peripheral nose portion,
   a second movable part of said mold half including a complementary surface to said nose portion which co-operates therewith and with another mold half to form a re-entrant portion on a plastic article,
   means for guiding said first part and said second part in generally diverging paths relative to said main body portion,
   means for moving said first and second mold parts in said divergent paths away from said main body portion at a rate in a direction axially of the main mold portion which is substantially equal until said second part clears the periphery of said nose portion of said first part and thereafter accelerating said second part in said divergent path and at a velocity such that the second part moves axially a greater distance than said first part to thereby strip the plastic article from the nose of said first part,
   and means for returning said second mold part toward said mold half at a greater rate than said first mold part to thereby move the second mold part into proper registering position with said first mold part for a successive molding cycle.

6. In an injection molding apparatus comprising complementary mold halves,
   said mold halves having molding surfaces defining a peripheral nose portion,
   one of said mold halves having the peripheral re-entrant portion defining surfaces thereof formed by two movable parts,
   one of said movable parts being movable relative to said mold generally axially,
   the other of said movable parts being movable relative to said mold in divergent paths away from said mold,
   said first mentioned part of said mold having a peripheral nose portion,
   said second mentioned part of said mold having a complementary surface defining the re-entrant portion of the plastic article and having a peripheral groove adapted to the edge of said re-entrant portion of said plastic article,
   an ejector plate,
   means mounted on said plate and movable through said one mold half to engage the plastic article and eject the major portion of the plastic article from the mold half,
   means interconnecting said ejector plate and said first mold part,
   means interconnecting said ejector plate and said second mold part,
   in such a manner that upon initial movement of said ejector plate, said first and second mold parts are moved in a divergent path at substantially the same axially rate, and after predetermined movement of said ejector plate an increased acceleration is applied to said second mold part after said second mold part has cleared the nose portion of said first mold part to move said second mold part in its divergent path at a more rapid rate and thereby cause the plastic article to be stripped from the nose portion of the first part.

7. The combination set forth in claim 6 including means for accelerating the second mold part at a more rapid rate upon movement of ejector plate in the opposite direction to move the second part toward its molding position and advances said first part so that the molding surface of said second part is in proper relation to the molding surface of said first part for the subsequent molding cycle.

8. In an injection mold apparatus, the combination comprising
   a mold half having a main body portion,
   a first movable part of said mold half including a peripheral nose portion,
   a second movable part of said mold half including a complementary surface to said nose portion which co-operates therewith and with another mold half to form a re-entrant portion on a plastic article,
   said second part having edge engaging means thereon for enegaging the edge of the plastic article,
   means for guiding said first part and said second part in generally diverging paths relative to said main body portion,
   means for moving said first and second mold parts in said divergent paths away from said main body portion at a rate in a direction axially of the main mold portion which is substantially equal until said second part clears the periphery of said nose portion of said first part,
   and means for thereafter accelerating said second part in said divergent path and at a velocity such that the second part moves axially a greater distance than said first part to thereby strip the plastic article from the nose of said first part.

9. The combination set forth in claim 8 wherein said edge engaging means comprises a groove in said second part.

10. In an injection mold apparatus, the combination comprising
   a mold half having a main body portion,
   a first movable part of said mold half including a peripheral nose portion,
   a second movable part of said mold half including a complementary surface to said nose portion which co-operates therewith and with another mold half to form a re-entrant portion on a plastic article,
   means for guiding said first part and said second part in generally diverging paths relative to said main body portion,
   means for moving said first and second mold parts in said divergent paths away from said main body portion at a rate in a direction axially of the main mold portion which is substantially equal until said second part clears the periphery of said nose portion of said first part,
   and means for thereafter moving said second part in said divergent path such that the second part moves axially a greater distance than said first part to thereby strip the plastic article from the nose of the first part.

References Cited by the Examiner
UNITED STATES PATENTS

| | | |
|---|---|---|
| 2,327,665 | 8/1943 | Peat. |
| 2,366,475 | 1/1945 | Bartholomew. |
| 3,020,594 | 2/1962 | Makowski _____ 264—318 |

FOREIGN PATENTS

| | | |
|---|---|---|
| 1,316,837 | 12/1962 | France. |

ROBERT F. WHITE, *Primary Examiner.*

R. B. MOFFITT, *Assistant Examiner.*